Inventor
JAMES BRADLEY
By Glascock, Downing &
Seiffert
ATTORNEYS

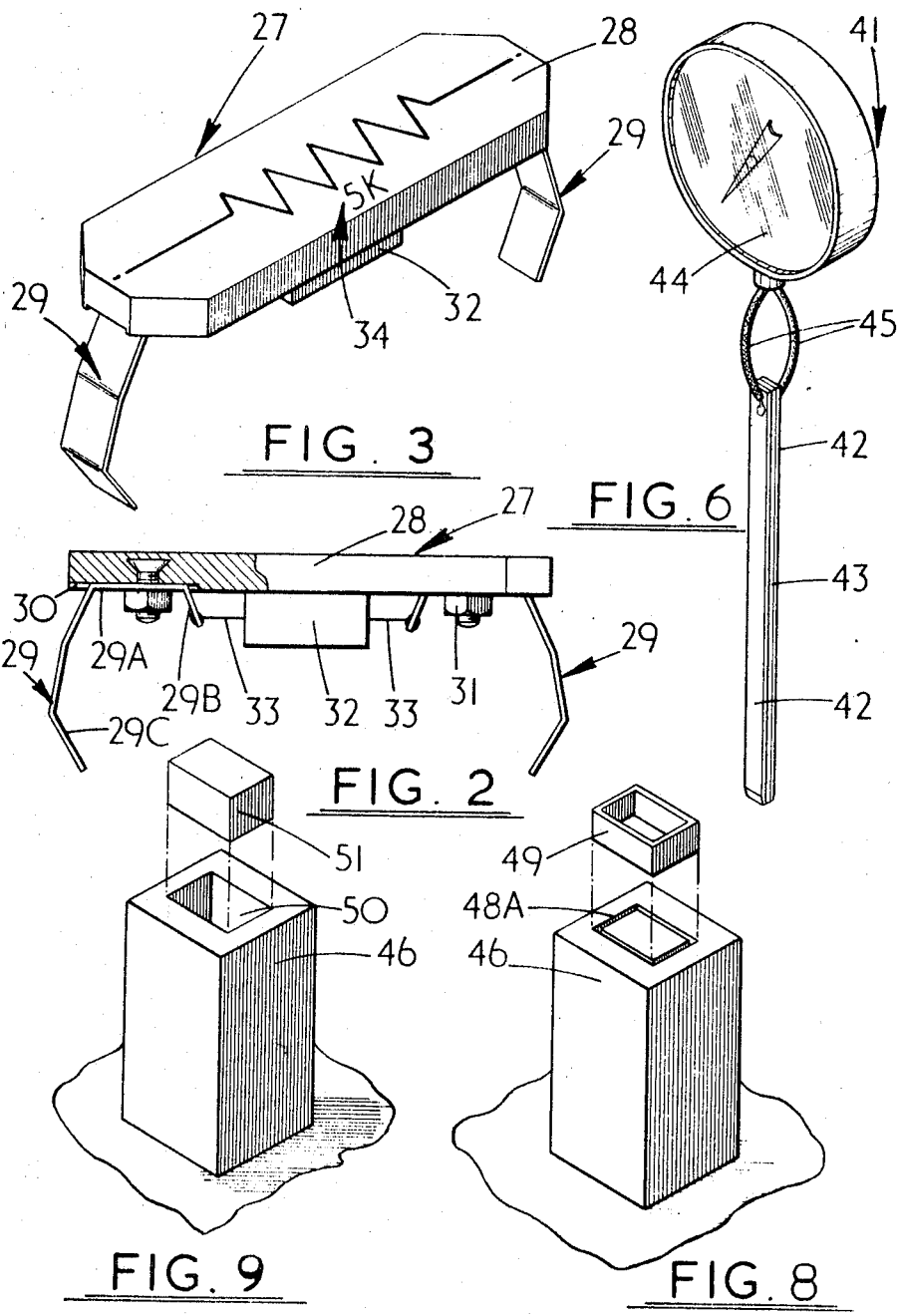

June 2, 1970           J. BRADLEY           3,514,872
DEVICES FOR BUILDING CIRCUIT ARRANGEMENTS
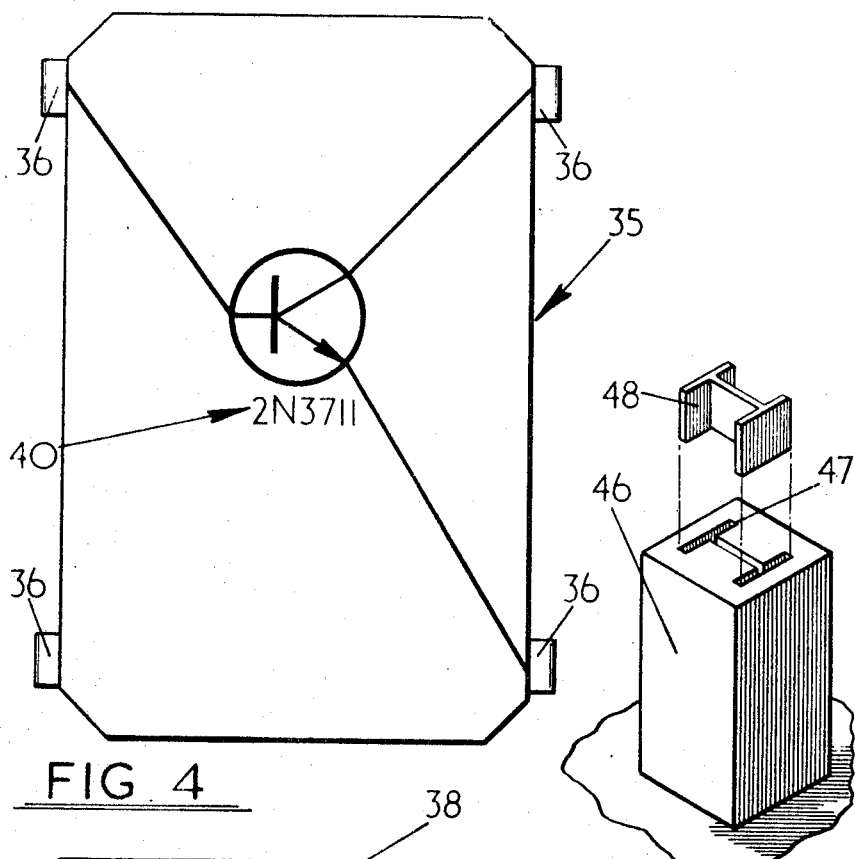
FIG. 4
FIG. 7
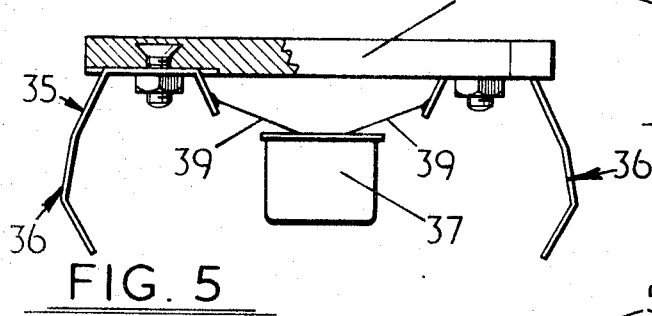
FIG. 5
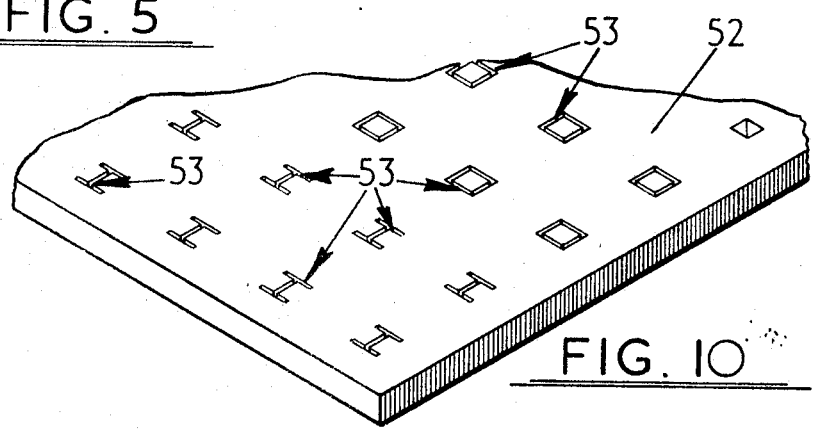
FIG. 10

United States Patent Office 3,514,872
Patented June 2, 1970

3,514,872
DEVICES FOR BUILDING CIRCUIT ARRANGEMENTS
James Bradley, Oldham, England, assignor of ½ to A. M. Lock & Company Limited, Oldham, England, a British company
Filed Aug. 11, 1967, Ser. No. 660,014
Int. Cl. G09b 23/18; H02b 1/04
U.S. Cl. 35—19                                                6 Claims

ABSTRACT OF THE DISCLOSURE

An electronic-circuit building arrangement having an assembly panel with a number of contact stations on one surface of it, adjacent contact stations being electrically connected by electronic-circuit components each including a component element and a viewable legend of the component element and/or kind.

---

This invention relates to devices for building circuit arrangements to facilitate the teaching of electronic theory and circuitry or for circuit research and development, or the like.

An object of the invention is to provide such a device which is simple and durable in construction and versatile in use.

According to the present invention, there is provided an electronic-circuit component for a device for building circuit arrangements comprising a mounting strip provided at least at each end with a resilient contact terminal, the component element being mounted on the underside of the strip and the upper side of the strip carrying a legend denoting the component element kind and/or value.

Also according to the present invention, there is provided a device for building circuit arrangements comprising an assembly panel having a plurality of contact stations arranged as an eqaully spaced co-ordinated array, each contact station being insulated from its neighbors and being adapted to receive the contact terminal of an electronic-circuit component as defined in the immediately-preceding paragraph.

Embodiments of the present invention will now be described, by way of example, with reference to the accompanying drawings, in which:

FIG. 2 is a sectional view of an electronic-circuit component for use in the device of FIG. 1;

FIG. 3 is a perspective view corresponding to FIG. 2;

FIGS. 4 and 5 are plan and a part-sectional side view of another electronic-circuit component for use in the device of FIG. 1;

FIG. 6 is a perspective view of a probe for use with the device;

FIGS. 7, 8 and 9 are fragmentary perspective views of various modified contact stations; and FIG. 10 is a perspective view of a modified assembly panel.

Figure 1:
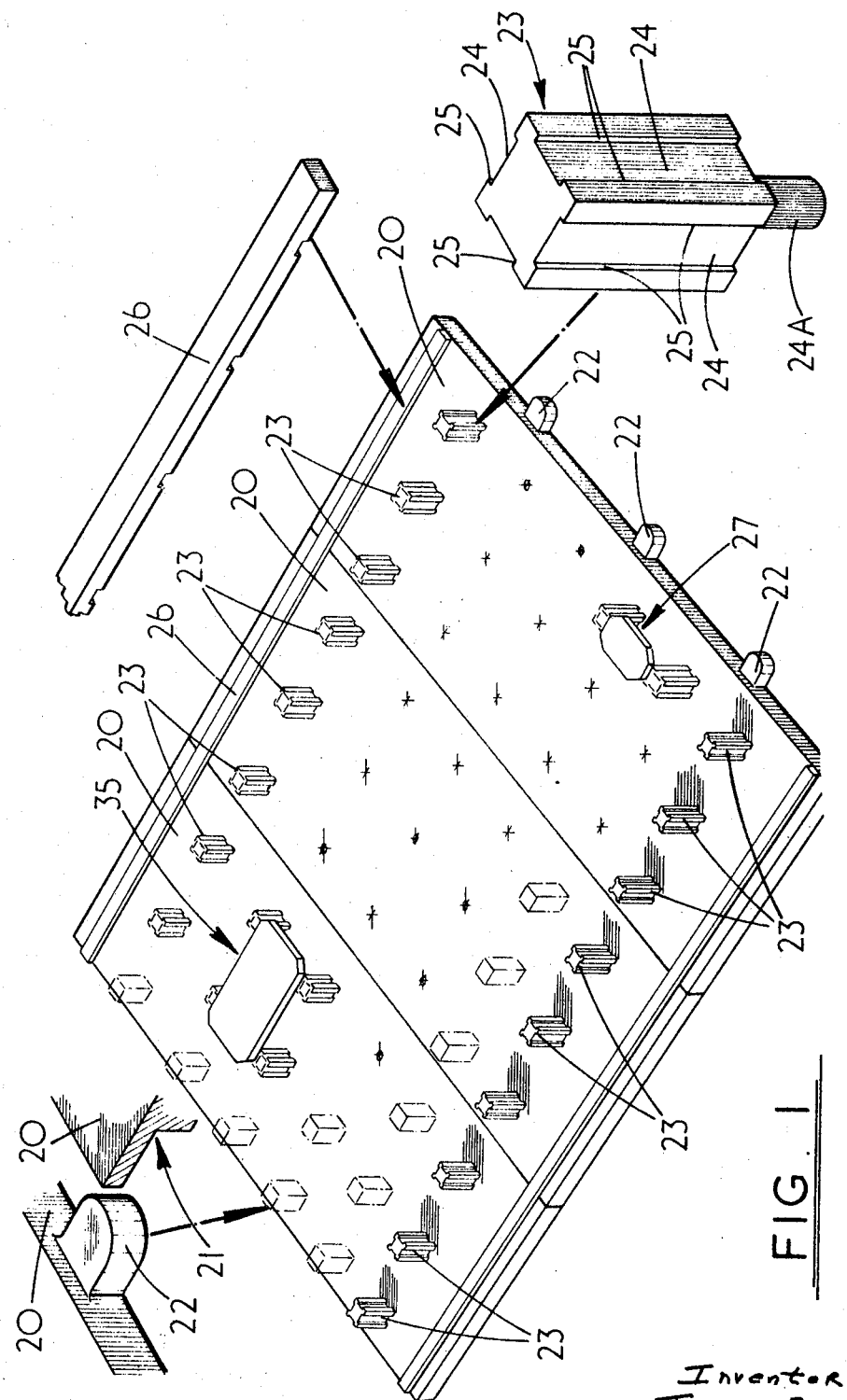
FIG. 1 is a perspective view of a device for building circuit arrangements in accordance with the present invention.

Referring to FIGS. 1 to 5 of the drawings, the device for building circuit arrangements comprises one or more flat assembly panels 20 formed of an insulation material. Each panel is preferably moulded from a synthetic plastics material. In FIG. 1 there is shown three interconnected assembly panels 20 which provides a preferred size of device. Each assembly panel 20 is formed at two opposed sides with spaced recesses 21 and projections 22 so that the panels can be assembled together. Each panel 20 has a multiplicity of contact stations arranged in an equally-spaced co-ordinated array. Each station is constituted by an upstanding metal pillar 23 having a coarse parallel knurled stem 24A which is set into the insulation material of the panel 20 so that it is firmly secured in position. Alternatively and preferably, each metal pillar 23 may have a tapped recess in its bottom and be accommodated in a recess in the panel 20, a screw being passed through the panel 20 from the bottom to screw-engage in the tapped hole and secure the pillar 23 in position. Each pillar 23 is formed on each vertical face with a recess 24 bounded by shoulders 25. A pair of parallel bus bars 26 are mounted on the three assembly panels 20 with the contact stations 23 therebetween and serve to deliver the electrical supply to the device. The bus bars 26, when the device is in use, the connected to the electrical supply in known manner.

The deivce also comprises a number of electronic-circuit components 27 which comprise a mounting strip 28 of insulation material provided at each end with a depending flexible metal contact blade 29 having a horizontal intermediate portion 29A, which sits in a recess 30 in the under side of the mounting strip 28 and is secured thereto by a nut-and-bolt 31, a short inner depending limb 29B and a long outer depending limb 29C which serves as the contact blade proper and which is splayed firstly outwardly and then inwardly. The width of each blade 29 is slightly less than the width of the recesses 24 in the contact stations 23. The electronic-circuit component 27 also comprises a components element 32, which may be, inter alia, a resistor or capacitor secured to the underside of the mounting strip and connected at its ends by conductors 33 to the short limbs 29B of the contact blades 29. A legend indicated at 34 denoting the characteristics of the component element i.e., the kind and/or value, in theoretical symbol is carried on the upper side of the mounting strip 28.

In FIGS. 4 and 5, there is shown an electronic-circuit component 35 of the kind having more than two terminal connections such for example as a transistor (as shown) a IF transformer, or a tapped coil. The component 35 is similar to the electronic-circuit component 27 save that it has four depending flexible contact blades 36 and the component element 37, which as mentioned above is a transistor, is suspended under the mounting strip 38, and is secured to the blades 36 by conductors 39.

The mounting strip 38 has on its upper side the appropriate legend 40 indicating the component element kind and/or value in theoretical symbol.

In assembling a number of electronic-circuit components to form an electronic circuit, the user selects the required components, such for example as 27 and 35 and builds his circuit by arranging the components in the correct order and inserting the adjacent contact blades 29 or 36 of neighboring components into the appropriate recesses 24 of an intervening contact station 23. The contact blades 29 or 36 are thus in electrical contact through the intermediary of the metal contact station 23. In this way, the electronic circuit is built up and the theoretical symbol of each electronic component can easily be view at the upper side of the mounting strips 28 or 38.

The assembled electronic-circuit components are connetced to the electrical supply bus bars 26 by conductors (not shown) in known manner.

It is to be noted that the resilient nature of the contact blades 29 or 36 holds each electronic-circuit component securely in position between neighbouring contact stations 23 and the shoulders 25 at each station 23 prevent lateral displacement of the electronic-circuit component.

It will be clear from the drawings that two, three or four electronic-circuit components can easily and readily be connected at a single contact station 23 at right angles to each other.

In FIG. 6, there is shown a probe 41 suitable for measuring, for example, the current at any point of the assembled circuitry without interrupting same. The probe 41 consists of two thin flat metal strips 42 sandwiching an insulating strip or film 43 and each metal strip 42 being connected to a measuring instrument for example an ammeter 44 by conductors 45. The insulating strip or film 43 is wider than the metal strips to obviate any risk of a short-circuit occuring.

In use the probe 41 is inserted between a blade and its contiguous contact station and a measure of current is obtained without interrupting normal circuit function.

Each contact station (see FIG. 7) may be constituted by an upstanding block 46 of resilient insulating material formed at its top with an H-shaped slit 47. In assembling the electronic-circuit components, in this instance, adjacent contact blades of neighbouring components are inserted into the same slit section of the H-shaped slit in an intervening contact block 46, the blades thus being contiguous and in metal-to-metal contact thus making electrical connection.

If it is desired to connect at a single contact block 46, two, three or four electronic-circuit components at right angles to each other, then this can be achieved by inserting in the H-shaped slit 47 of the block 46 an H-shaped springly conducting metal insert 48.

The H-shaped slit may be replaced by a rectangular slit 48A (see FIG. 8) housing an appropriately shaped flexible metal insert 49. Alternatively, each contact block is formed with an appropriately-shaped hole 50 in which is recessed a correspondingly shaped metal insert 51. For example, the hole 50 may be rectangular and the insert 51 of solid rectangular configuration as shown in FIG. 9.

The upstanding contact blocks may be omitted and the surface of the assembly panel 52 (see FIG. 10) suitably slitted with or without appropriate metal inserts as required, and as generally indicated at 53.

The above-described probe can be employed with the device as modified in any of the ways described above.

While it is preferred to employ flexible contact blades as the terminals of the electronic-circuit components, it will be manifest that any convenient resilient contact terminal construction may be employed.

What is claimed is:
1. A device for building circuit arrangements comprising an assembly panel, a plurality of contact stations insulated one from another and arranged as an equally-spaced coordinated array on the assembly panel, and each presenting a plurality of contact surfaces, and a plurality of circuit components each for insertion between adjacent contact stations and including a mounting strip having on its upper side a legend denoting characteristics of a circuit component element, a circuit component element corresponding to the legend supported underneath the mounting strip, and flexible contact blades depending from and projecting outwardly of the mounting strip in electrical connection with terminals of the circuit component element for making face-to-face electrical mating contact with station contact surfaces, said mounting strip being of a size and shape so as to extend between said contact stations and provide access to the upper ends of the respective mating contact blades and station contact surface, said mating flexible contact blades and station contact surfaces defining entry means at their upper ends for the probe of a measuring instrument.

2. A device as claimed in claim 1, in which each contact station is an upstanding metal pillar recessed on each of its vertical faces and with shoulders at each side of each recess.

3. A device as claimed in claim 1, in which each contact station is a block of insulating material formed on its top surface with a contact blade-accommodating slit.

4. A device as claimed in claim 3, in which the slit is of H configuration.

5. A device as claimed in claim 1, in which each contact station is a block of insulating material formed in its top surface with an appropriately shaped hole in which is recessed a correspondingly-shaped metal insert.

6. A device as claimed in claim 5, in which the hole is rectangular and the metal insert is of solid rectangular configuration.

References Cited
UNITED STATES PATENTS

| 1,684,161 | 9/1928 | Traubitz | 339—125 |
|---|---|---|---|
| 2,722,777 | 11/1955 | Simpson. | |
| 2,788,470 | 4/1957 | Giel et al. | 317—101 |
| 2,796,683 | 6/1957 | Hayne | 35—19 |
| 2,983,892 | 5/1961 | Williams | 35—19 X |
| 3,001,106 | 9/1961 | Higgs | 35—19 X |
| 3,175,304 | 3/1965 | Och et al. | 35—19 |
| 3,386,010 | 5/1968 | Nojiri | 35—19 X |

FOREIGN PATENTS

| 552,966 | 2/1958 | Canada. |
|---|---|---|
| 1,012,846 | 4/1952 | France. |
| 200,993 | 7/1923 | Great Britain. |

EUGENE R. CAPOZIO, Primary Examiner

H. S. SKOGQUIST, Assistant Examiner

U.S. Cl. X.R.

317—101; 339—128